United States Patent [19]
Kato

[11] 3,819,583
[45] June 25, 1974

[54] METHOD OF PREPARING FERROCENE POLYMERS
[75] Inventor: Hiroshi Kato, Takatsuki, Japan
[73] Assignee: Dainichi-Nippon Cables, Ltd., Hyogo-ken, Japan
[22] Filed: Sept. 5, 1972
[21] Appl. No.: 286,359

[30] Foreign Application Priority Data
Sept. 10, 1971 Japan.............................. 46-70638
Dec. 22, 1971 Japan............................ 46-104998

[52] U.S. Cl............. 260/63 R, 260/67 R, 260/67 A
[51] Int. Cl...................... C08g 13/00, C08g 15/00
[58] Field of Search............... 260/67 A, 67 R, 63 R

[56] References Cited
UNITED STATES PATENTS
3,341,495  9/1967  Neuse ................................. 260/67
3,437,634  4/1969  Neuse ................................. 260/47
3,448,082  6/1969  McGarth et al. ..................... 260/67
3,504,052  3/1970  Neuse et al. ........................ 260/836
3,640,959  2/1972  Bilow et al. .......................... 260/64
3,640,963  2/1972  Bilow et al. ........................ 260/67 R Primary Examiner—Lester L. Lee
Attorney, Agent, or Firm—Stevens, Davis, Miller & Mosher

[57] ABSTRACT

The present invention provides a method of preparing ferrocene polymers which comprises reacting ferrocene with aldehydes or ketones in the presence of a Lewis acid catalyst and an aprotic, polar solvent having a dipole moment of at least 0.5 Debye.

The invention has the following advantages in comparison with prior arts; (1) polymer yields are considerably improved. Usually 30 – 60 percent increases are achieved. (2) Quantity of tarry by-products is very small. (3) Most of the ferrocene polymers obtained are tractable. (4) Some of the ferrocene polymers obtained have extremely high electric conductivity.

14 Claims, No Drawings

METHOD OF PREPARING FERROCENE POLYMERS

BACKGROUND OF THE INVENTION

1. Field of the Invention

This invention relates to a novel method of preparing ferrocene polymers. More particularly, it provides an improved methods of preparing ferrocene polymers by reacting ferrocene with aldehydes or ketones.

2. Description of the Prior Art

Heretofore, there have been proposed several methods of preparing ferrocene polymers by reacting ferrocene with some aldehydes and ketones, as described in U.S. Pat. Nos. 3,341,495; 3,437,634, 3,640,961; etc. However, those methods have a several disadvantages, such as (1) polymer yields being generally low, (2) tarry substance as by-product being in large amounts, (3) many of the ferrocene polymers obtained being intractable, that is, insoluble in most solvents and unfabricatable into fibers.

SUMMARY OF THE INVENTION

The present invention provides a method of preparing ferrocene polymers which comprises reacting ferrocene with at least one member selected from the group consisting of aldehydes and ketones in the presence of a Lewis acid catalyst and an aprotic, polar solvent having a dipole moment of at least 0.5 Debye. The invention can overcome those disadvantages of the prior methods substantially.

DETAILED DESCRIPTION OF THE INVENTION

As described above, this invention comprises reacting ferrocene with at least one member selected from the group consisting of aldehydes and ketones in the presence of a Lewis acid catalyst and an aprotic, polar solvent having a dipole moment of at least 0.5 Debye.

The ferrocene polymers obtained in the present invention have alternative linear structures of ferrocene and aldehyde or ketone moieties, as shown in the following general formula (1),

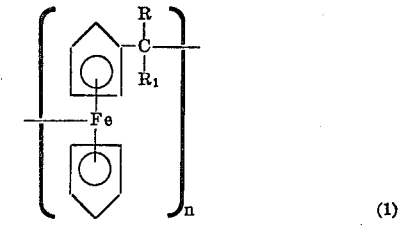

(1)

wherein R and $R_1$ are hydrogen atom, alkyl, alkenyl, aralkyl, or aryl group, and may also be permitted to construct a spiro-ring between R and $R_1$, where alicyclic ketones, such as cyclohexanone, are employed as said ketone.

The value of $n$ is a positive integer between 15 to 1,000, and the centered position of the substituent link on the left-hand side of formula (1) implies that the formula (1) involves 1,1'-, 1,2-, and 1,3-substitutions as well as a mixture of those.

The present invention gives the following various advantages in comparison with the prior methods by carrying out the polymerization reactions in the presence of a Lewis acid catalyst and an aprotic, polar solvent described later.

1. Polymer yields are considerably improved. Usually 30 — 60 percent increases are achieved in comparison with prior arts.
2. Quantity of tarry by-products is reduced to less than approximately one-third of that of prior arts, and in most cases the quantity is negligible small.
   In addition, the tarry by-products outgrowing in the prior arts are mostly insoluble or hardly soluble in any solvent. Whereas, those of the present invention are so readily soluble in several solvents, such as benzene, acetone and chloroform as to make the purification of the ferrocene polymers easier.
3. Most of the ferrocene polymers obtained in this invention are tractable; they are soluble in some organic solvents and can be fabricated into a filament.
4. Ferrocene polymers with extremely high electric conductivity, ($10^3$ ohm-cm. of lower in volume resistivity) may be prepared by selecting a kind of aldehydes or ketones. Such a high conductivity in the ferrocene polymers has never been attained previously.

In the present invention, aldehydes or ketones used have the general formula:

$$RCOR_1$$

wherein R and $R_1$ are selected from the group consisting of hydrogen atom, alkyl, alkenyl, aralkyl and aryl, or when taken together form a spiro-ring.

Typical examples of aldehydes and ketones are:

1. Compounds of which at least one group attached to carbonyl group is one containing at least one aromatic nucleus; 1-naphthylaldehyde, 2-naphthylaldehyde, p-tolylaldehyde, 2-phenanthrylaldehyde, α, β-diphenylpropionaldehyde, o-phenylbenzaldehyde, p-phenylbenzaldehyde, phenylacetaldehyde, 2,6-dimethylbenzaldehyde, β-phenylpropionaldehyde, 1-anthrylaldehyde, acetophenone, methylbenzylketone,, phenyl ethyl ketone, o-methylacetophenone, m-methylacetophenone, phenyl-n-propyl ketone, phenyl isopropyl ketone, p-methylpropiophenone, o-ethylacetophenone, 2,4-dimethylacetophenone, 3,5-dimethylacetophenone, phenyl n-butyl ketone, phenyl s-butyl ketone, phenyl t-butyl ketone, 2,4,5-trimethylacetophenone, 2-phenylcyclopentanone, phenyl neopentyl ketone, 2-phenylcyclohexanone, 7-acenaphthenone, methyl α-naphthyl ketone, 9-acetylanthracene, acetylbiphenyl, anthrone, fluorenone, acetylfluorene, p-methylbenzophenone, 3-benzoylphenanthrene, 1-benzoylacenaphthene, 9-anthraphenone, tetraphenylacetone, 1-indanone, ethyl benzyl ketone, benzylacetone, 3-phenyl-2-butanone, α-tetralone, β-tetralone, 3-phenyl-2-pentanone, 4-phenyl-2-pentanone, 5-phenyl-2-pentanone, 2-methyl-1-tetralone, 3-methyl-1-tetralone, 7-methyl-1-tetralone, 6-acetyltetralin, benzylpinacolone, 6-propionyltetralin, phenyl benzyl ketone, cyclopropyl phenyl ketone, cyclohexyl phenyl ketone, o-chlorobenzaldehyde, o-iodobenzaldehyde, m-chlorobenzaldehyde, p-chlorobenzaldehyde, p-iodobenzaldehyde, p-dimethylaminobenzaldehyde, 1-bromonaphthaldehyde, α-bromobenzyl acetaldehyde, o-chlorobenzophenone, 4-phenyl-3-bromo-2-butanone, α-chloro-α-phenylacetone, m-chloroacetophenone, m-bromophenacylbromide.

2. Compounds of which at least one group attached to carbonyl group is an aliphatic group or an alicyclic group;

n-nonylaldehyde, n-decanal, n-tetradecanal, cyclohexanealdehyde, diethylacetaldehyde, 3,3-dimethylpentanal, valeraldehyde, butyraldehyde, methylethylacetaldehyde, trimethylacetaldehyde, caproic aldehyde, cyclopentylaldehyde, cyclopropylaldehyde, octaldehyde, acetone, methyl ethyl ketone, methyl n-propyl ketone, methyl isopropyl ketone, diethyl ketone, methyl n-butyl ketone, methyl isobutyryl ketone, methyl s-butyl ketone, methyl n-amyl ketone, methyl isoamyl ketone, 3-methyl-2-hexanone, 3-ethyl-2-pentanone, diisopropyl ketone, ethyl isobutyl ketone, ethyl isoamyl ketone, isopropyl isobutyl ketone, isopropyl t-butyl ketone, 4-methyl-2-octanone, di-n-butyl ketone, di-t-butyl ketone, isopropyl t-amyl ketone, methyl n-octyl ketone, syn-tetraethyl acetone, di-n-amyl ketone, methyl n-decyl ketone, di-n-octyl ketone, stearone, dicyclopropyl ketone, cyclohexylacetone, cyclopentyl methyl ketone, cyclopentyl methyl ketone, 2-methylcyclohexyl methyl ketone, tribromoacetaldehyde, β-chloropropionaldehyde, α-bromoisobutylaldehyde, bromoparacetaldehyde, 2-methyl-2,3-dichloropentanal, α-bromoheptaldehyde, 4-amino-2-heptanone, 1-cyano-2-pentanone, chloroethyl methyl ketone, bromoethyl ethyl ketone, ethyl β-chloroethyl ketone, 6-bromo-2-hexanone, 1-bromo-3,3-dimethyl-2-butanone.

3. Alicyclic ketones;

cyclopropanone, cyclobutanone, cyclopentanone, cyclohexanone, cycloheptanone, cyclooctanone, 2,2,6,6-tetramethylcyclohexanone, 2-phenylcyclohexanone, 2-chlorocyclohexanone, 2-cyclohexenone, 2-cyclopentenone, 2-cycloheptenone, tropolone, tropone, 2-cyclooctenone.

4. Compounds of which at least one group attached to carbonyl group is a heterocyclic group;

furfural, 3-furaldehyde, tetrahydrofurylaldehyde, 2-thiophenealdehyde, 3-phenaldehyde, α-pyrrolealdehyde, 5-methylfurfural, 3-methyl-2-thiophene-aldehyde, nicotinaldehyde, β-furylpropionaldehyde, indole-3-aldehyde, coumarin-3-aldehyde, quinoline-2-aldehyde, quinoline-4-aldehyde, iso-quinaldehyde, dibenzofuran-2-aldehyde, 5-methylfurfural, 3-thiophanone, 2-acetylfuran, 2-acetylthiophene, α-furylacetone, ethyl 2-furyl ketone, 2-acetyl-5-methyl-furan, α-thienylacetone,, ethyl 2-thienyl ketone, 2-acetyl-5-methylthiophene, ethyl 2-pyridyl ketone, ethyl 3-pyridyl ketone, 1-(α-furyl)-2-butanone, 5-methyl-2-propionfuran, n-propyl 3-pyridyl ketone, methyl 2-benzofuryl ketone, 2-benzoyl furan, 2-acetylquinoline, 8-acetylquinoline, 2-benzoylpyridine, 2-phenacylpyridine, 2-acetyldibenzofuran, 2-acetyldibenzothiophene.

5.-1 Compounds of which at least one group attached to carbonyl group is an α,β-unsaturated olefinic group;

acrolein, methacrolein, crotonaldehyde, 2-methylcrotonaldehyde, 3-methylcrotonaldehyde, 2-ethyl-crotonaldehyde, 1-cyclopentenealdehyde, 2-methyl-1-cyclopentenealdehyde, 2-ethyl-1-cyclopentenealdehyde, 1-cyclohexenealdehyde, 2-methyl-1-cyclohexenealdehyde, 2-phenyl-1-cyclohexenealdehyde, 1-cycloheptenealdehyde, cinnamaldehyde, 2-phenyl-crotonaldehyde, 2-methylcinnamaldehyde, 2-phenylcinnamaldehyde, 2-ethylcinnamaldehyde, furfural, methyl vinyl ketone, ethyl vinyl ketone, methyl isopropenyl ketone, trans-3-hepten-2-one, 5-methyl-4-hexen-3-one, 5,5-dimethyl-3-hexen-2-one, 7-methyl-5-octen-4-one, 3-propyl-3-hexen-2-one, 2-cyclohexenone, 2-cyclopentenone, 2-cycloheptenone, 2-cyclooctenone, tropone, 2,4,5-trimethyl-4-hexen-3-one.

5.-2 Compounds of which at least one group attached to carbonyl group is an unsaturated olefinic group other than α,β-unsaturated groups;

3-hexenaldehyde, 2-methyl-2-hexenaldehyde, 2-heptenaldehyde, 2-octenaldehyde, 2-nonenaldehyde, 2-cyclohexenaldehyde, 2-cyclopentenaldehyde, 3-cyclooctenaldehyde, 2-methylcycloheptenaldehyde, coumarin-3-aldehyde, methyl propenyl ketone, allylacetone, 4-hexen-2-one,, mesityloxide, methallylacetone, 4,4-dimethyl---penten-3-one, 3-ethyl-5-hexen-2-one, 2,3-dimethyl-6-hepten-4-one, 4-cyclohexenyl methyl ketone, 3-cyclohexenyl methyl ketone.

6. Compounds of which at least one group attached to carbonyl group is a hydroxy-substituted or an alkoxy-substituted group;

o-anisaldehyde, m-anisaldehyde, p-anisaldehyde, salicylaldehyde, o-ethoxybenzaldehyde, m-ethoxy-benzaldehyde, p-ethoxybenzaldehyde, 3,4-diethoxy-benzaldehyde, phenoxybenzaldehyde, resorcylaldehyde, m-hydroxybenzaldehyde, ethylphenylglycolic aldehyde, 1-naphthol-2-aldehyde, diphenylglycolic aldehyde, glycolaldehyde, α-hydroxypropionaldehyde, hydroxypyruvic aldehyde, 4-hydroxybutanal, 5-hydroxypentanal, α,α-dimethyl-β-hydroxypropionaldehyde, methyl-n-butylglycolic aldehyde, 9-hydroxynonanal, methoxyacetaldehyde, ethoxyacetaldehyde, β-methoxyiso-butyraldehyde, 2-methyl-2,3-dimethoxy-pentanal, 2-ethoxy-1-naphthaldehyde, m-benzyloxybenzaldehyde, 3,4,5-trimethoxybenzaldehyde, acetol, 1-hydroxy-butanone, 1-hydroxy-2-pentanone, 4-hydroxy-2-heptanone, 5-hydroxy-2-heptanone, methoxymethyl methyl ketone, methoxypropyl propyl ketone, isopropoxymethyl methyl ketone, α-methoxypinacolone, 1-methoxyethyl isobutyl ketone, phenoxyacetone, α-methoxyacetophenone, β-naphthoxyacetone, m-methoxybenzophenone, p-phenoxybenzophenone, n-propoxymethyl phenyl ketone, m-hydroxyacetophenone, p-propiophenol, o-propiophenol, acetyl phenyl methylcarbinol, 4-ethoxycyclohexyl isopropyl ketone, 4-hydroxycyclohexyl methyl ketone, 4-methoxycyclohexyl t-butyl ketone, tropolone.

The halo-, amino- and cyano-substituted compounds are also involved as indicated above.

Among the above-mentioned many aldehydes and ketones, there are preferably employed compounds of which each of both groups, R and $R_1$ attached to carbonyl group have a carbon number of 25 or less, the alicyclic ketones having a carbon number of 30 or less.

More preferably $\alpha,\beta$-unsaturated compounds of which both groups attached to carbonyl group have a carbon number of 25 or less.

Examples of Lewis acid are metal halides, such as $FeCl_3$, $SnCl_2$, $AlCl_3$, $ZnCl_2$, $TiCl_4$, $FeBr_3$, $AlBr_3$, $SnCl_4$, and halogens, such as $I_2$, $Br_2$, and boron compounds, such as $BF_3$, $BF_3 \cdot O(CH_2CH_3)_2$, $B(CH_3)_3$. Preferable examples of Lewis acids are the metal halides and the halogens as abovementioned. A mixture of those two or more Lewis acids may also be used. The most preferable is $FeCl_3$, $AlCl_3$ or $SnCl_2$.

In the present invention, employment of an aprotic, polar solvent with a dipole moment of at least 0.5 Debye is essential as a reaction solvent.

Of the solvents, more the preferable are those which are miscible with water in any portion, can dissolve Lewis acids in the ratio of at least 20 parts by weight to 100 parts by weight of the solvent, and have a boiling point of 80°C. or higher.

Examples of such preferable solvents are N,N-dimethylformamide, N,N-dimethylacetamide, N-methyl-2-pyrrolidone, dimethylsulfoxide, hexamethylphosphoramide, acetonitrile, polyphosphoric acid. Especially, N,N-dimethylformamide, N,N-dimethylacetamide, N-methyl-2-pyrrolidone and dimethylsulfoxide are most preferable in the viewpoint of easy removal and recovering of the solvent and purification of the products. The aprotic, polar solvents with a dipole moment of at least 0.5 Debye can be successfully utilized not only by itself, but also as a mixture with one or more other aprotic, polar solvents.

Furthermore, those mixtures containing an aprotic solvent having a dipole moment of less than 0.5 Debye may be utilized, so long as the mixtures keep the value of the dipole moment at least 0.5 Debye.

In the present invention ferrocene and aldehyde or ketone are allowed to react generally in 1 : 1 molar ratio, more preferably in a ratio of 0.8 to 0.9 mole of aldehyde or ketone to 1 mole of ferrocene. The quantity of aprotic, polar solvent is selected from the range of 100 to 2,000 parts by weight to 100 parts by weight of reactants (ferrocene plus aldehyde or ketone). In case where the solvent is employed in a quantity in excess of said upper limit, the reaction rate tends to decrease and the molecular weight of the ferrocene polymer yielded becomes also lower by reason of diluted concentration of the reactants in the reaction system.

On the other hand, where the quantity of the solvent is less than said lower limit, it begins to bring about somewhat disadvantages as those of prior arts because of the reaction condition coming to close that of the solvent-free reaction.

The polymerization reactions in the present invention are carried out preferably at a temperature above 40°C., more preferably within a temperature range of 70° to 180°C., most preferably, 70° to 150°C.

Reaction at a temperature of above 180°C., however, is not recommendable since in most cases such a reaction at high temperature results in the formation of ferrocene polymers thermally deteriorated more or less.

The reaction period varies within about 0.5 to 8 hours, depending upon reaction temperature, kind and quantity of Lewis acid catalyst, polar solvent, and aldehyde or keton used, etc.

The polymerization reactions in accordance with the invention may be performed in a variety of conventional ways under an atmospheric or pressuerized conditions.

Ferrocene polymers thus obtained are rather lighter tone than that of the corresponding polymers obtained in prior art, and have molecular weight of approximately 1,500 to 200,000. Many of these are soluble in N,N-dimethylformamide, N,N-dimethylacetamide, dimethylsulfoxide, etc., partly soluble in acetone, chloroform, etc.

They have good thermal and oxidative stability, flexibility or elasticity. Most ferrocene polymers obtained in accordance with the invention are useful as a paint material, reaction catalyst, hardner, stabilizer or antioxidant for rubbers and plastics. Furthermore, they possess good tractability and superior electric conductivity, therefore they will find a wider application in the electronic or electric industry as a semiconductive or conductive polymeric material.

The invention will be described in greater detail by reference to the following Examples, together with Comparative Examples. All parts and percents are by weight unless otherwise indicated.

EXAMPLE 1

Into a 20 ml. four-necked round bottom flask equipped with mechanical stirrer and reflux condenser were placed 1.2 parts of ferrocene, 5 parts of N,N-dimethyl-formamide DMF, dipole moment 3.86 Debye *1), 1 part of benzaldehyde, and 0.1 part of anhydrous ferric chloride ($FeCl_3$) in this order. Dry nitrogen was flushed three times into the system so as to exhaust air, and the system was maintained under inert gas atmosphere during the reaction.

The mixture was vigorously agitated, and slightly exothermic reaction was occurred and the mixture was discolored from deep red to dark brown. Then the mixture was quickly heated to 120°C. under vigorous stirring. (All temperatures are centigraded). Heating was continued at this temperature for 1 hour, thereafter the mixture was cooled to room temperature to give elastic mass together with viscous solution. The crude product was filtered and the elastic mass was washed with three 20 ml. portions of hot water and dried under a reduced pressure (2mmHg).

The filtrate was diluted with 50 ml. of water and the precipitate was collected by filtration, washed with hot water, dried, and combined into major part of the polymeric product. The crude polymer was extracted (Soxhlet) with petroleum ether followed by benzene extraction. Purified polymer as light brown mass was obtained in almost quantitative yield (97 percent), and exhibited the softening range 160° to 175°, semiconducting property (volume resistivity = 2.04 × $10^5$ ohm-cm. *2) and characteristic infrared adsorption bands at 1600, 1150, 1100, 1010, 795, and 695 cm.$^{-1}$ This polymer was readily soluble in DMF, N,N-dimethylacetamide (DMAc) or dimethylsulfoxide (DMSO), and could be fabricated into fibers by injecting its DMF solution into water (hereinafter, such features are briefly called "tractable") and was able to mold into a sheet (such a feature briefly called "elastic") at 120° under pressure (over 5 kg./cm.$^2$).

From petroleum ether and benzene extracts excess and unreacted ferrocene was recovered quantitatively after $Al_2O_3$ column chromatographic separation and even a trace of tarry product was not detected. *1 Dipole moment ($\mu$) was obtained from the following Lorentz-Lorentz equation;

$$\mu = 0.0128 \quad (P-1.05M_{RD})T$$

wherein T is absolute temperature, P is specific dielectric constant and $M_{RD}$ is molecular reflutive index. P was measured using OE-21 Type electrode for liquid sample manufactured by Yokogawa Electric Co., at 26°, 1 KHz and $M_{RD}$ was measured by sodium D-line. *2 As a volume resistivity $p$ was adopted the value obtained after 1 minute charge at 23°, DC 5V using metallic plate electrode (surface area 20 $cm.^2$).

Comparative Example 1

Employing the same equipment used in the preceding Example, the mixture of 1 part of benzaldehyde, 1.2 parts of ferrocene and 0.1 part of $FeCl_3$ was heated with vigorous stirring under nitrogen atmosphere, the temperature was raised to 175°. Heating was continued at this temperature for 1 hour, the mixture became highly viscous and agglomerated around the stirring rod. The cooled crude product was solidified, extracted exhaustively with hot water to remove residual catalyst, and dried. After purification of the pulverized polymer by means of Soxhlet extraction with petroleum ether and benzene, dark brown polymer was isolated in only 45.5 percent yield. This polymer did not melt at 300° or above, and was insoluble or hardly soluble in many organic solvents such as acetone, chloroform, acetic acid, dimethyl sulfoxide, and even in DMF, DMAc, and DMSO (hereinafter, the poorer solubility of ferrocene polymer in DMF, DMAc and DMSO is referred to as "intractable"). This powdery polymer exhibited electric semiconductivity with a volume resistivity 3 × $10^7$ ohm-cm. Although evaporation of the petroleum ether and benzene extracts followed by $Al_2O_3$ column chromatography gave a recovery of unreacted ferrocene in several portions, the formation of significant amount of tarry material was observed.

Example 2

The general procedure of Example 1 was repeated except that 1 part of p-tolylaldehyde was employed instead of 1 part of benzaldehyde. Polycondensation was proceeded similarly, and tractable, elastic polymer of copper-toned was obtained in 85 percent yield after usual work up. This polymer showed an excellent electric conductivity (7.05 × $10^3$ ohm-cm.) after exhaustive purification in usual manner, and characteristic infrared absorption bands at 1600, 1380, 1170, 1095, 1005, 800 and 710 $cm^{-1}$ Comparative Example 2

Similar reaction with the preceding Example was carried out without solvent, and intractable, powdery polymer of brownish black was obtained in 50 percent yield after usual work up. This polymer exhibited rather lower electric conductivity (2.5 × $10^7$ ohm-cm.), but no enhancement of electric conductivity was observed after exhaustive purification; this bihavior was distinct from the polymer obtained in Example 2.

Example 3

The mixture of 1.2 parts of ferrocene, 1 part of p-anisaldehyde, 5 parts of N,N-dimethylacetamide (DMAc, dipole moment 3.79 Debye), and 0.1 part of $FeCl_3$ was heated at 120° for 1 hour with vigorous stirring under nitrogen atmosphere. After usual procedure described in Example 1, tractable and elastic polymer of dark brown was isolated in almost quantitative yield (98 percent), which was soluble even in acetone. The polymer showed a moderate semiconductivity of 5.38 × $10^6$ ohm-cm. Infrared spectrum of this polymer showed absorption bands at 1610, 1380, 1240, 1145, 1005, 810, and 710 $cm.^{-1}$ Comparative Example 3

Similar reaction with Comparative Example 1 was repeated except that 1 part of p-anisaldehyde was employed instead of benzaldehyde. The mixture was not solidified as different as seen in Comparative Example 1, and the viscosity of the mixture was somewhat lower. After removal of unreacted monomer by washing with petroleum ether and benzene, respectively, a small amount of polymeric substance was obtained (less than 10 percent yield).

When the reaction was repeated at 185° for 1 hour, no steep increase of viscosity also occurred, and black tarry product was formed. Crude product was carefully poured into a 300 ml. of mixture of water and methanol (1 : 2) to precipitate a polymeric portion. The precipitate was collected by filtration, washed with three 50 ml. portions of water. Drying under a reduced pressure (2mmHg) followed by benzene extraction gave a black powder in 60 percent yield having a volume resistivity of 7.8 × $10^6$ ohm-cm.

Example 4

The mixture of 1.2 parts of ferrocene, 1 part of cinnamaldehyde, 5 parts of DMAc and 0.1 part of well ground anhydrous aluminium chloride ($AlCl_3$) was vigorously agitated and an exothermic reaction occurred without discoloration. The mixture was heated at 120° for 1 hour under nitrogen atmospheric condition. Identical work up (purification) described in Example 1 gave a desired polymeric product as a tractable, elastic brown mass in quantitative yield (98 percent) having a characteristic infrared absorption bands at 1180, 1150, 1085, 1030, 965, 750, and 710 $cm.^{-1}$ This polymer was also semiconductive with a volume resistivity of 2.0 × $10^6$ ohm-cm. and showed softening range 170° to 178°.

Example 5

Ferrocene (1.2 parts), crotonaldehyde (1 part), and well pulverized stannyl chloride ($SnCl_2$) were mixed in 5 parts of N-methyl-2-pyrrolidone (dipole moment 4.01 Debye) without any exothermic reaction and discoloration. The resulting mixture was stirred and heated at 100° to 110° for 1 hour. Cooling, followed by usual work up described in Example 1 gave a tractable, elastic polymer as a brown mass in excellent yield (as high as 92 percent). This polymer exhibited a significant electric conductivity (6.6 × $10^3$ ohm-cm.) as its characteristics.

Example 6

General procedure of Example 1 was repeated except that 1 part of furfural and 5 parts of hexamethylphosphoramide (HMPA, dipole moment 4.31 Debye) as solvent instead of benzaldehyde and DMF, respectively. Reaction was carried out the same as in Example 1, and desired polymer as brown sponge was isolated in 75 percent yield after usual work up, which polymer was one of the most elastic among a series of the ferrocene polymers and could easily be molded into a sheet capable of elongating under a considerable tensile force. This polymer had a softening point 180°.

It was also found that the polymer showed a semiconducting property (with volume resistivity of $2.3 \times 10^7$ ohm-cm.), and characteristic infrared absorption bands at 1600, 1275, 1160, 1020, 935, and 800 cm.$^{-1}$

Comparative Example 4

Employing similar reaction conditions used in Comparative Example 1, 1.2 parts of ferrocene, 1 part of furfural and 0.1 part of anhydrous $FeCl_3$ were heated with rapid stirring without any solvent. At the end point of the reaction, a mixture became a highly viscous which solidified as black mass when cooled to room temperature. Well pulverized crude product was thoroughly washed with hot water, dried and purified by means of Soxhlet extraction (using petroleum ether and benzene as solvent) to give intractive black powder in 34 percent yield.

Comparative Example 5

To elucidate the effect of solvent, similar reaction described in Comparative Example 4 was carried out at 120° for 1 hour. In this condition, only a small amount of black polymer which resembles to one obtained in Comparative Example 4 was isolated, in less than 7 percent yield after usual procedure. Dark brown to black tar was formed in significant amount, and over 80 percent of unreacted ferrocene was recovered, while recovery of furfural was not exceeded 20 percent probably due to oxidative side reaction which would lead to tarry product.

Example 7

A mixture of 1.2 parts of ferrocene, 1 part of n-nonyl aldehyde, 0.1 part of pulverized $SnCl_2$ and 5 parts of DMF was well stirred and heated at 120° for prolonged period (2 hours) owing to relatively low reactivity of n-nonyl aldehyde. Usual work up gave an elastic, tractable polymer in good yield (over 88 percent yield) which had infrared absorption bands at 2800, 1450, 1380, 1240, 1030, 820, and 715 cm.$^{-1}$

Example 8

The general procedure of Example 1 was repeated except that 1 part of p-dimethylaminobenzaldehyde was employed instead of benzaldehyde. Dark brown, tractable polymer was obtained in 80 percent yield exhibiting a moderate electric conductivity of $5.1 \times 10^7$ ohm-cm. Characteristic infrared absorption bands of this polymer were observed at 1605, 1385, 1380, 1235, 1150, 860, 820, and 730 cm.$^{-1}$

Example 9

The reaction described in Example 1 was repeated using 1 part of salicylaldehyde instead of benzaldehyde and tractable polymer was obtained as polymeric semiconductor ($1.8 \times 10^7$ ohm-cm.) in over 80 percent yield. Among the characteristic infrared absorption bands of this polymer, the band assigned to isolated hydroxyl group was found at 3620 cm.$^{-1}$

Comparative Example 6

Similar reaction described in preceding Example was repeated except that 5 parts of toluene (dipole moment 0.37 Debye) was employed as solvent instead of DMF, and reaction was carried out at reflux temperature of toluene (110° to 112°) for 5 hours, under continuous stirring and then allowed to cool. Usual work up gave a polymer as intractable brown powder in only 45 percent yield. The formation of tarry substances was observed in amount of 8 percent (based on ferrocene used), and about 50 percent of unreacted ferrocene was recovered.

Example 10

The same reaction as described in Comparative Example 6 was carried out with a mixture (dipole moment 1.76 Debye) of toluene and DMF (4 : 6). The reaction was completed within only 1.5 hours, and tractable, brown polymer was obtained in 75 percent yield after general procedure. Furthermore, unreacted ferrocene was recovered in almost quantitative amount accompanying with negligible amount of tarry by-products.

Example 11

The same reaction as described in Example 9 was also effected except that 0.1 part of $SnCl_2$ was employed as catalyst instead of $FeCl_3$. Deep orange mixture became greenish gray in the final stage, and the polymer was obtained in 73 percent yield after purification. This tractable, elastic polymer had a volume resistivity of $6.35 \times 10^7$ ohm-cm. the same as that of the specimen obtained in Example 9.

Example 12

A mixture of 1.2 parts of ferrocene, 1 part of propionaldehyde, 5 parts of DMF, and 0.1 part of iodine ($I_2$) was placed in a sealed tube to avoid evaporation of the aldehyde (boiling point 41°). The vessel was gently heated, and heating was continued at 110° to 120° for 1 hour in an oil bath. After usual treatment of the products, purified polymer was obtained as dark brown powder in good yield (approximately 84 percent). This polymer was soluble in DMF, HMPA and dimethylsufloxide.

Example 13

The reaction similar to Example 12 was also carried out but less effective at reflux temperature of the aldehyde. More prolonged reaction time (8 hours or longer) was required to obtain fairly good yield of polymer (above 75 percent). The polymer isolated here was tractable.

Comparative Example 7

When the same reaction as described in preceding Examples (Examples 12 and 13) was carried out without solvent, no significant amount (less than 10 percent yield) of polymeric substance was isolated, while by-products with unknown structure as black tar was formed in amount of 20 percent bared on ferrocene used.

Example 14

The general procedure of Example 2 was repeated except that the reaction was carried out at 80° for 2 hours. After work up in usual manner, tractable, dark brown polymer was isolated in 72 percent yield. This polymer exhibited almost identical infrared absorption bands and electric conductivity with that of polymer obtained in Example 2.

Example 15

Into a 20 ml. of four-necked round bottom flask equipped with mechanical stirrer and reflux condenser was placed 1 part of ferrocene, 0.95 part of benzophenone, 0.2 part of $FeCl_3$ and 10 parts of dimethylsulfoxide (DMSO) in this order. Dry nitrogen was flushed several times into the system and the system was maintained under inert gas atmosphere during the reaction. The mixture was heated at 140° with vigorous stirring in the course of 2 hours, and the polymeric mass was solidified as copper-toned elastomer. Bulk of the solvent was removed by filtration, poured into water (100 ml.), precipitate formed was collected and combined with the major fraction. The combined polymeric fraction was washed with water, extracted (Soxhlet) with petroleum ether and benzene, respectively, and dried under a reduced pressure (2 mmHg). Tractable polymer was isolated in 75 percent yield exhibiting infrared absorption bands at 1600, 1280, 1185, 1070, 950, and 700 cm.$^{-1}$ It was also found that the polymer was prominent organic semiconductor with volume resistivity of $2.0 \times 10^5$ ohm-cm.

From petroleum ether and benzene extracts about 15 percent of unreacted ferrocene was recovered after $Al_2O_3$ column chromatography and even a trace of tarry material was not detected.

Furthermore, reactions employing DMF or DMAc as solvents were also effective the same as the case using DMSO.

Example 16

The similar reaction with Example 15 was also effected employing 10 parts of nitrobenzene (dipole moment 4.21 Debye) as a solvent instead of DMSO. Owing to insolubility of nitrobenzene in water, most of the solvent was removed by distillation to isolate the product. Defferent from the preceding Examples wherein the solvents were removed extremely easily by washing with water for their miscibility with water, exaustive removal of nitrobenzene from the product was significantly difficult, and more careful procedures were required. Washing of filtered polymer with a mixture of petroleum ether and benzene (1 : 1) followed by drying at 60° under a reduced pressure (2mmHg) for over night gave a dark brown, tractable polymer of fairly semiconductive in 70 percent yield. The infrared spectrum of this polymer was nearly coincided with that of polymer obtained in Example 15.

Example 17

A mixture of 1 part of ferrocene, 0.6 part of cyclohexanone, 0.05 part of $SnCl_2$, 0.05 part of $ZnCl_2$, and 10 parts of N-methyl-2-pyrrolidone was well stirred and heated at 140° in the course of 2 hours under nitrogen atmosphere. After usual treatment, brown tractable polymer having conductivity of $2.5 \times 10^8$ ohm-cm. was obtained in good yield (75 percent or more) exhibiting characteristic infrared absorption bands at 1600, 1280, 1105, 1030, 720 and 700 cm.$^{-1}$ From non-polymeric fraction, 28 percent of unreacted ferrocene was recovered after $Al_2O_3$ column chromatography.

Example 18

The same reaction as Example 17 was carried out except that 0.1 part of $FeCl_3$ was employed instead of $SnCl_2$ and $ZnCl_2$. In this example, more elastic, tractable polymer of copper-toned was obtained in excellent yield (82 percent). This polymer could be molded into a sheet and exhibited almost identical infrared spectrum to that of polymer obtained in Example 17. Recovery of unreacted ferrocene was about 6 percent.

Example 19

A mixture of 1 part of ferrocene, 0.9 part of acetophenone, 10 parts of DMF and 0.1 part of $FeCl_3$ was reacted in similar manner described in Example 15, and tractable elastic polymer exhibiting good electric conductivity of $3.0 \times 10^7$ ohm-cm. was isolated in 71 percent yield. The reaction employing 10 parts of DMAc or DMSO as solvent was also effective similarly.

Comparative Example 8

The reaction which described in Example 19 was carried out without solvent, and intractable copper-toned polymeric material was isolated in rather sluggish yield (56 percent or lower). This polymer exhibited rather inferior electric conductivity ($4 \times 10^9$ ohm-cm.). About 36 percent of unreacted ferrocene was recovered.

Example 20

The similar reaction as described in Example 19 was carried out by using 10 parts of benzonitrile instead of DMF. Tractable and elastic polymer of brown mass was obtained in 69 percent yield exhibiting semiconductivity of $5.2 \times 10^7$ ohm-cm. The reaction employing 10 parts of acetonitrile as solvent at 82° to 84° for 2 hours was also effective similarly, and the polymer was isolated in 65 percent yield.

Example 21

A mixture of 1 part of ferrocene, 0.95 part of benzophenone, 0.2 part of stannic chloride ($SnCl_4$) and 10 parts of polyphosphoric acid was heated at 160° for 1.5 hours. After usual work up described in Example 15, tractable, elastic polymer was obtained in 68 percent yield. This polymer was also semiconductive of $6.8 \times 10^7$ ohm-cm.

Example 22

The similar reaction to Example 7 was carried out by employing 10 parts of a mixture (dipole moment 0.7 Debye) of toluene and DMF (9 : 1) instead of DMF. This mixture could not dissolve said Lewis acid over 20 percent, consequently the reaction system became heterogeneous. Nevertheless prolonged reaction period (4 hours), the yield (82 percent) was slightly decreased than those in Example 7.

What is claimed is:

1. A method of preparing ferrocene polymers having the general formula:

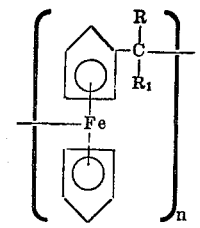

wherein R and $R_1$ are selected from the group consisting of hydrogen atom, alkyl, alkenyl, aralkyl, and aryl group, and when taken together form a spiro-ring, and n is a positive integer between 15 to 1000, which comprises reacting ferrocene
with at least one member selected from the group consisting of aldehydes and ketones having general formula:

$$RCOR_1$$

wherein R and $R_1$ are the same as described above,
in the ratio of 0.8 to 1 mole of aldehydes or ketones to 1 mole of ferrocene,
at a temperature of from above 40° to 180°C
in the presence of a catalytically effective amount of a Lewis acid catalyst and an aprotic, polar solvent having a dipole moment of at least 0.5 Debye which is present in the ratio of 100 to 2,000 parts by weight to 100 parts by weight of the total amounts of said reactants.

2. The method of claim 1, wherein said aprotic, polar solvent is the one which is miscible with water in any portion, and can dissolve said Lewis acid in the ratio of at least 20 parts by weight to 100 parts by weight of the solvent.

3. The method of claim 2, wherein said aprotic, polar solvent is at least one member selected from the group consisting of N,N-dimethylformamide, N,N-dimethylacetamide, N-methyl-2-pyrrolidone, dimethylsulfoxide, hexamethylphosphoramide, acetonitrile, benzonitrile and polyphosphoric acid.

4. The method of claim 1, wherein said Lewis acid is at least one member selected from the group consisting of metal halides and halogens.

5. The method of claim 4, wherein said Lewis acid is at least one member selected from the group consisting of $FeCl_3$, $SnCl_2$ and $AlCl_3$.

6. The method of claim 1, wherein said aldehydes and ketones are the compounds of which at least one group attached to carbonyl group is one member selected from the group consisting of aliphatic groups and alicyclic groups.

7. The method of claim 1, wherein said ketones are alicyclic ketones.

8. The method of claim 1, wherein said aldehydes and ketones are the compounds of which at least one group attached to carbonyl group is a heterocyclic group.

9. The method of claim 1, wherein said aldehydes and ketones are the compounds of which at least one group attached to carbonyl group is an olefinic group.

10. The method of claim 1, wherein said aldehydes and ketones are the compounds of which at least one group attached to carbonyl group is a group containing at least one aromatic nucleus.

11. The method of claim 1, wherein said olefinic group is an $\alpha$, $\beta$-olefinic group.

12. The method of claim 1, wherein said compound is at least one member selected from the group consisting of acrolein, crotonaldehyde, 2-methylcrotonaldehyde, 3-methylcrontonaldehyde, 1-cyclohexenealdehyde, 2-phenyl-1-cyclohexenealdehyde, cinnamaldehyde, 2-phenylcinnamaldehyde, furfural, methyl vinyl ketone, ethyl vinyl ketone, 2-cyclohexenone, 2-cyclopentenone and methacrolein.

13. The method of claim 1, wherein said method is carried out at a temperature of 70° to 180°C.

14. The method of claim 1 wherein said aldehydes and ketones are selected from the group consisting of o-anisaldehyde, m-anisaldehyde, p-anisaldehyde, salicylaldehyde, o-ethoxybenzaldehyde, m-ethoxybenzaldehyde, p-ethoxybenzaldehyde, 3,4-diethoxybenzaldehyde, phenoxybenzaldehyde, resorcylaldehyde, m-hydroxybenzaldehyde, ethylphenylglycolic aldehyde, 1-naphthol-2-aldehyde, diphenylglycolic aldehyde, glycolaldehyde, $\alpha$-hydroxypropionaldehyde, hydroxypyruvic aldehyde, 4-hydroxybutanal, 5-hydroxypentanal, $\alpha$, $\alpha$-di-methyl-$\beta$-hydroxypropionaldehyde, methyl-n-butylglycolic aldehyde, 9-hydroxynonanal, methoxyacetaldehyde, ethoxyacetaldehyde, $\beta$-methoxy-iso-butyraldehyde, 2-methyl-2,3-dimethoxypentanal, 2-ethoxy-1-naphthaldehyde, m-benzyloxybenzaldehyde, 3,4,5-trimethoxybenzaldehyde, acetol, 1-hydroxy-butanone, 1-hydroxy-2-pentanone, 4-hydroxy-2-heptanone, 5-hydroxy-2-heptanone, methoxymethyl methyl ketone, methoxypropyl propyl ketone, iso-propoxymethyl methyl ketone, $\alpha$-methoxypinacolone, 1-methoxyethyl isobutyl ketone, phenoxyacetone, $\alpha$-methoxyacetophenone, $\beta$-naphthoxyacetone, m-methoxybenzophenone, p-phenoxybenzophenone, n-propoxymethyl phenyl ketone, m-hydroxyacetophenone, p-propiophenol, o-propiophenol, acetyl phenyl methylcarbinol, 4-ethoxycyclohexyl isopropyl ketone, 4-hydroxycyclohexyl methyl ketone, 4-methoxycyclohexyl t-butyl ketone, and tropolone.

* * * * *